United States Patent
Tsirkin et al.

(10) Patent No.: US 9,753,861 B2
(45) Date of Patent: Sep. 5, 2017

(54) EXIT-LESS MOVEMENT OF GUEST MEMORY ASSIGNED TO A DEVICE IN A VIRTUALIZED ENVIRONMENT

(71) Applicant: Red Hat Israel, Ltd., Raanana (IL)

(72) Inventors: Michael Tsirkin, Yokeneam Yillit (IL); Andrea Arcangeli, Imola (IT)

(73) Assignee: Red Hat Israel, Ltd, Raanana (IL)

( * ) Notice: Subject to any disclaimer, the term of this patent is extended or adjusted under 35 U.S.C. 154(b) by 209 days.

(21) Appl. No.: 14/723,183

(22) Filed: May 27, 2015

(65) Prior Publication Data
US 2016/0350235 A1   Dec. 1, 2016

(51) Int. Cl.
*G06F 12/08* (2016.01)
*G06F 12/1081* (2016.01)
*G06F 13/28* (2006.01)
*G06F 9/455* (2006.01)

(52) U.S. Cl.
CPC ...... *G06F 12/1081* (2013.01); *G06F 9/45545* (2013.01); *G06F 9/45558* (2013.01); *G06F 13/28* (2013.01); *G06F 2009/4557* (2013.01); *G06F 2009/45579* (2013.01); *G06F 2009/45583* (2013.01); *G06F 2212/656* (2013.01)

(58) Field of Classification Search
CPC .. G06F 12/1081; G06F 13/24; G06F 9/45545; G06F 9/45558; G06F 2009/45579; G06F 2009/45583; G06F 2212/657
See application file for complete search history.

(56) References Cited

U.S. PATENT DOCUMENTS

| | | | |
|---|---|---|---|
| 6,496,909 B1 | 12/2002 | Schimmel | |
| 7,065,630 B1 * | 6/2006 | Ledebohm | G06F 12/1081 710/8 |
| 7,409,525 B1 | 8/2008 | Clark et al. | |
| 7,421,533 B2 | 9/2008 | Zimmer et al. | |
| 7,500,048 B1 | 3/2009 | Venkitachalam et al. | |

(Continued)

OTHER PUBLICATIONS

IOMMU Architectural Specification, "AMD I/O Virtualization Technology (IOMMU) Specification", http://developer.amd.com/wordpress/media/2012/10/34434-IOMMU-Rev_1.26_2-11-09.pdf, Feb. 2009, 90 pages.

(Continued)

*Primary Examiner* — Glenn A Auve
(74) *Attorney, Agent, or Firm* — Lowenstein Sandler LLP (57) ABSTRACT

Embodiments of the disclosure enable exit-less movement of guest memory assigned to a device in a virtualized environment. An example method comprises detecting, by a processing device of a host computer system, an event triggering a move/copy of a memory page residing at a first memory location that is mapped to a virtual address space of a virtual machine being hosted by the host computer system. Thereafter, the first memory location is un-mapped from the virtual address space of the virtual machine. Responsive to determining that a DMA write indicator associated with a hardware device assigned to the virtual machine indicates that a DMA write operation is not in progress, the memory page is moved from the first memory location to a second memory location. Then, the second memory location is mapped into the virtual address space of the virtual machine for use by an input/output memory management unit.

15 Claims, 5 Drawing Sheets

(56) References Cited

U.S. PATENT DOCUMENTS

| | | |
|---|---|---|
| 7,613,898 B2 | 11/2009 | Haertel et al. |
| 7,702,826 B2 | 4/2010 | Oztaskin et al. |
| 7,984,108 B2 | 7/2011 | Landis et al. |
| 8,145,470 B2 | 3/2012 | Green |
| 8,307,169 B2 | 11/2012 | Elteto |
| 8,392,628 B2 | 3/2013 | Santos et al. |
| 8,938,571 B1 | 1/2015 | Vincent |
| 8,954,959 B2 | 2/2015 | Tsirkin et al. |
| 8,984,478 B2 | 3/2015 | Epstein |
| 2013/0013877 A1* | 1/2013 | Tian .................. G06F 12/10 711/165 |
| 2013/0091500 A1 | 4/2013 | Earl et al. |
| 2013/0145073 A1 | 6/2013 | Tuch et al. |
| 2013/0326179 A1 | 12/2013 | Tsirkin et al. |
| 2016/0267051 A1* | 9/2016 | Metzler ............. G06F 15/167 |

OTHER PUBLICATIONS

Willmann, Paul et al., "Protection Strategies for Direct Access to Virtualized I/O Devices", https://www.usenix.org/legacy/events/usenix08/tech/full_papers/willmann/willmann_html/index.html, 2008, 24 pages.

"Intel® Virtualization Technology for Directed I/O", http://www.csit-sun.pub.ro/~cpop/Documentatie_SM/Intel_Microprocessor_Systems/Intel%20TechnologyNew/Intel(r)_VT_for_Direct_IO.pdf, Sep. 2008, 152 pages.

Gordon, Abel et al., "Towards Exitless and Efficient Paravirtual I/O", http://researcher.watson.ibm.com/researcher/files/il-ABELG/elvis-systor12.pdf, Jun. 4, 2012, 6 pages.

Kehayias, Jonathan, "Great SQL Server Debates: Look Pages in Memory", Dec. 12, 2011, 5 pages.

Otey, Michael, "Using Hyper-V Dynamic Memory with SQL Server", Jul. 19, 2012, 8 pages.

* cited by examiner

EXIT-LESS MOVEMENT OF GUEST MEMORY ASSIGNED TO A DEVICE IN A VIRTUALIZED ENVIRONMENT

TECHNICAL FIELD

The present disclosure is generally related to virtualized computer systems, and is more specifically related to systems and methods for exit-less movement of guest memory assigned to a device in a virtualized environment.

BACKGROUND

Virtualization of a computer system involves the creation and management of one or more distinct software environments known as "virtual machines" (VMs). The actual physical computer system that supports the VMs is typically referred to as a "host machine." The operating system of the host machine is typically referred to as a "host operating system" while the operating system of the VMs is referred to as a "guest operating system." On the host machine, a virtual machine monitor known as a "hypervisor" manages the execution of the VMs, and provides a variety of functions, such as allocating resources of the host machine to the VMs.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The present disclosure is illustrated by way of examples, and not by way of limitation, and may be more fully understood with references to the following detailed description when considered in connection with the figures, in which.

DETAILED DESCRIPTION

Described herein are techniques for a virtual machine monitor (VMM), such as a hypervisor, to move memory (e.g., copy data from one memory location to another location) allocated to a "guest" operating system of a virtual machine (VM) that is assigned to control a hardware device of a host machine by checking a direct memory access (DMA) indicator indicating whether a DMA operation is being initiated by the hardware device. For example, the DMA operation may include a DMA write operation indicating that a DMA capable device is writing to guest memory allocated by the hypervisor of the host machine.

A hypervisor can run a plurality of guest operating systems on the host machine. The hypervisor "virtualizes" the physical host machine by exposing "virtual" resources to the guests that run on top of the hypervisor. Each guest is allocated a portion of memory (e.g., guest memory) from the host machine by the hypervisor. This guest memory may include virtual addresses that map to physical addresses in main memory of the host machine. In certain implementations, the hypervisor may provide each guest with a set of virtual hardware devices to control, and the guest controls the virtual hardware instead of the real hardware coupled to the host machine. For example, the hypervisor may assign a hardware device to a VM on which the guest operating system is running. Typically, when the hardware device is assigned to a VM, the device cannot be assigned to another VM and can only be used exclusively by the VM to which the device is assigned.

The guest operating system may direct some of these virtual devices, independently of a central processing unit (CPU) of the host machine, to read from or write to guest memory directly using guest virtual addresses, rather than real physical addresses on the host machine. This process of reading from or writing to addressable memory directly by the devices is called DMA. Some devices that are capable of performing DMA include disk drive controllers, graphics cards, network cards, sound cards, etc.

At the moment, when a hardware device is assigned to a VM, the underlying physical addresses of the host machine that map to virtual addresses associated with the VM cannot change. This is because guests of the VM typical are un-ware of the physical addresses that map to their virtual addresses. As such, if the guest operating system tries to instruct the device to perform DMA on guest memory using a virtual address where the underlying physical address has been moved by the host, this would lead to a memory fault. In such circumstances, when trying to move memory around, the hypervisor simply skips memory associated with a VM assigned to the device. The hypervisor may try to move memory around for various reasons. For example, the hypervisor may move memory around for certain application optimization techniques, such as Non-Uniform Memory Access (NUMA) and transparent huge pages, where access times depend on the location of data in memory. As a result, such optimization techniques do not work when guests are using assigned devices.

In accordance with one embodiment of the present disclosure, before a guest of a VM initiates a request for a DMA operation, such as a DMA write operation, to be performed by a DMA capable device assigned to the VM, the guest checks the DMA direction. If the request is from the device (for example, to guest memory), the guest sets an indicator, such as the DMA write indicator. Setting of the DMA indicator indicates that a DMA write operation is in progress by the device. Otherwise, (for example, if the request is to the device from guest memory) the DMA write indicator may indicate that a DMA write operation is not in progress by the device. The DMA write indicator may be part of a data structure that includes address information for specific memory pages allocated to the guest by the host. For example, the DMA write indicator may be an in progress bit flag in a table that maintains virtual addresses of the guest memory pages. The guest may mark this DMA write indicator for every page in which a DMA write operation is in progress. The guest then triggers a memory access to the specified pages by the DMA capable device assigned to the VM. After the DMA write operation is complete, the guest would unmark the DMA write indicator, e.g., clear the DMA operation's in progress bit flag.

In operation, the hypervisor may detect an event triggering a move of a memory page residing at a first memory location mapped to a virtual address space of a virtual machine. For example, the hypervisor may detect that a memory page associated with the first memory location needs to move as part of an optimization technique. Here, the hypervisor has assigned the virtual machine a device to control. In this case, the hypervisor un-maps the first memory location from the virtual address space of the virtual machine. Then, a DMA indicator associated with the device is checked by the hypervisor. This DMA indicator resides in a shared memory of the hypervisor that is accessible by the virtual machine.

If the check of the DMA indicator indicates that a DMA write operation is in progress by the device, the hypervisor may cancel a move operation for the memory page. In some embodiments, the hypervisor may defer the move operation for the memory page until a second triggering event. For example, this second triggering event may include the hypervisor detecting again a need to move the memory page or waiting for a timeout period to expire.

If the DMA indicator indicates that a DMA write operation is not in progress by the device, the hypervisor may move or copy data from the first memory location associated with the memory page to a second memory location, e.g., a different memory address in memory of the host machine. Then, the hypervisor may map the second memory location into the virtual address space of the virtual machine. In some embodiments, the mapping of the second memory location to the virtual address may be performed "lazily," that is, responsive to detecting the guest access to the second memory location. Embodiments of the present disclosure thus allows for DMA to work without an exit or explicit notification by VMs to the hypervisor, instead a shared memory is used and is read by the hypervisor when or if it attempts to move memory for a VM assigned to a DMA capable device.

Figure 1:
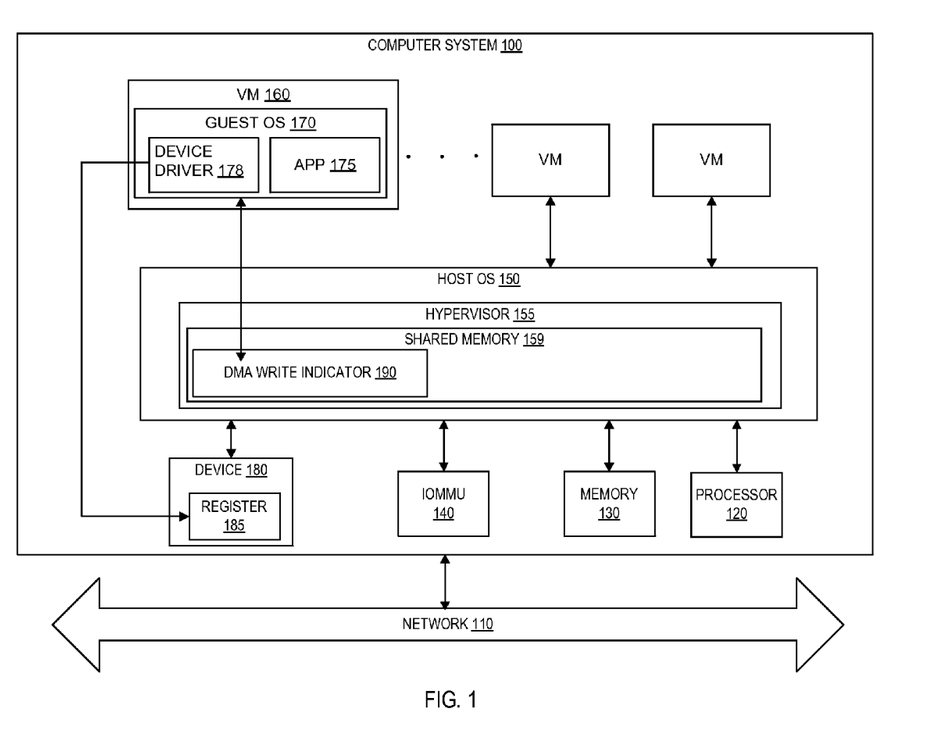
FIG. 1 depicts a high-level component diagram of an example computer system in accordance with one or more aspects of the present disclosure.

FIG. 1 depicts a high-level component diagram of an exemplary computer system 100 that may be used to implement one or more aspects of the present disclosure. As shown, the computer system 100 may be coupled to a network 110 include a processor 120 communicatively coupled to a memory 130, an input/output memory management unit (IOMMU) 140 and an I/O device, such as device 150.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single device 150.

The computer system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Computer system 100 may run "host" software, such host operating system 160, that manages the hardware resources of the computer system and that provides functions such as interprocess communication, scheduling, memory management, and so forth. In one embodiment, the host operating system 160 may also comprises a hypervisor 165 also known as a virtual machine monitor (VMM), which may be software that provides a virtual operating platform for the set of virtual machines (VMs), and manages the execution of these virtual machines.

Hypervisor 165 may take many forms. For example, hypervisor 160 may be part of or incorporated in the host operating system 160 of computer system 100, or hypervisor 165 may be running on top of the host operating system 160. Alternatively, hypervisor 165 may a "bare metal" hypervisor that runs on hardware of computer system 100 without an intervening operating system. The hypervisor 165 may abstract the physical layer of computer system 100, including processor 120, memory 130 and device 150, and present this abstraction to the VMs as virtual devices. The hypervisor 160 may support multiple VMs residing on the computer system 100. In some embodiments, more than one hypervisor (not shown) may be provided to support the VMs of the computer system 100.

Each virtual machine (VM) of the VMs, such as VM 170, may be a software implementation of a machine that executes programs as though it were an actual physical machine. Each virtual machine may execute a "guest" operating system (guest OS) 170 and other types of software and/or applications (app) 175. The hypervisor 170 can either handle request by the VMs for machine resources, or forward the request to the host operating system 160, as well as various faults and interrupts.

In one embodiment, the computer system 100 includes one or more devices 150 (also referred to as "I/O devices," e.g., audio/video devices, network interface devices, printers, graphics modules, etc.) that are capable of performing a DMA write operation. For simplicity of the illustration, only one device 150 is shown. It is understood that the computer system 100 may include any number of devices. In one embodiment, guest OS 180 send request, such as a DMA write operation, for the device 150 to perform. For example, guest OS 180 may include a device driver 188 that can write to registers 155 in the device 150.

The device 150 may include one or more registers 155 containing addresses (e.g., virtual addresses allocated to VMs) that are directly accessible by the device 150 in the DMA write operation. The addresses in the registers 155 are referred to as bus addresses or DMA address. For simplicity of discussion, only one bus address is described. It is understood that a DMA write operation may involve multiple DMA addresses. The registers 155 may store a DMA address and an offset to indicate an address range of a DMA buffer. The DMA buffer is in the address space allocated to virtual machine 170. The device 150 to directly transfer input data to the virtual machine 170 and/or directly transfer output data from the virtual machine 130 can use the DMA buffer. The DMA buffer may span one or more memory pages with each memory page having a fixed size (e.g., a 4K-byte block).

Computer system 100 also includes an IOMMU 140 that is responsible for translating the bus address of a host device, such as device 150, into a host physical address. For example, the IOMMU 140 may be coupled to one or more I/O devices and memory 130 of computer system 100. The IOMMU 140 is a memory management unit that connects a direct memory access-capable (DMA-capable) I/O bus to system memory. The IOMMU 140 is configured to translate the virtual addresses in the DMA write operation from the guest OS 180 to physical addresses to access the system memory, e.g., memory 130.

According to one embodiment, the guest OS 180 may set a DMA write indicator 190 before initiating a request of a DMA write operation to be performed by device 180. In some embodiments, the hypervisor 155 may store the DMA write indicator 190 in a shared memory 159 that is accessible by guest OS 180. The DMA write indicator 190 may be part of a data structure that includes but is not limited to a table. In this regard, the table may include a plurality of entries where each entry is associated with the virtual address of a memory page allocated to the guest OS 180. These virtual addresses may map to physical addresses in memory 130. The guest OS 180 may mark or otherwise set in the table a DMA write indicator 190 for each memory page in which the DMA write operation is in progress.

In one embodiment, before a memory page from memory 130 that is assigned to guest OS 170 is moved, the hypervisor 155 un-maps the memory page from guest OS 170 and checks the DMA write indicator 190 associated with device 180. If the DMA write indicator 190 indicates that a DMA write operation is in progress by the device 180, the hypervisor 155 may cancel or defer a move operation for the memory page. If the DMA write indicator 190 indicates that a DMA write operation is not in progress by the device 180, the hypervisor 155 may copy data from the memory page to a new memory page in memory 130. Then, the new memory page may be mapped to the guest OS 170. For example, hypervisor 155 may send a modification request to IOMMU 140 that causes the IOMMU 140 to modify a memory page mapping for guest OS 170 to point to the new memory page.

Figure 2:
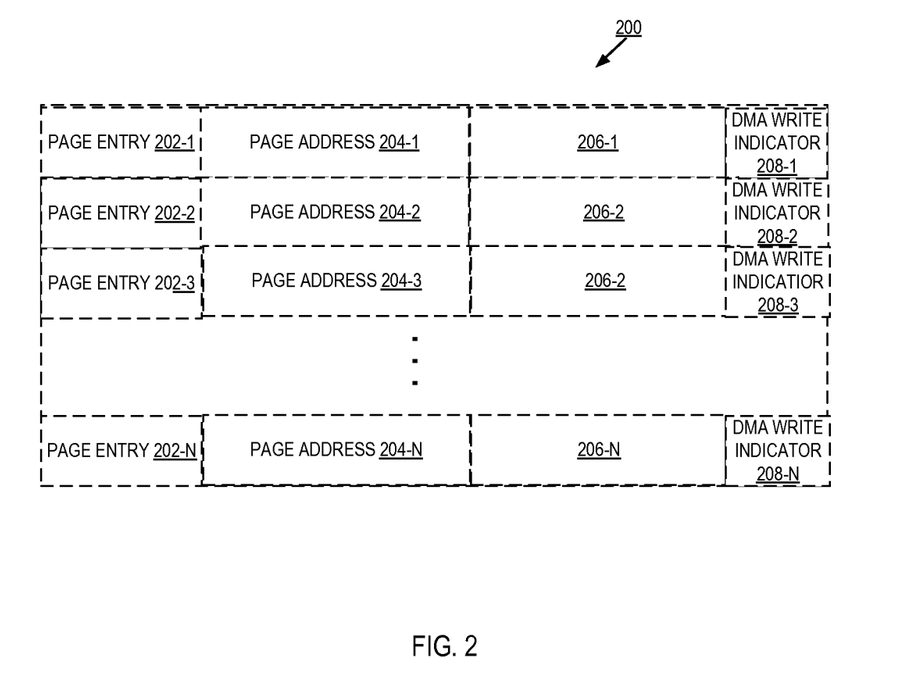
FIG. 2 depicts a data structure in accordance with one or more aspects of the present disclosure.

FIG. 2 depicts a data structure 200, which can one or more DMA write indicators 208-1 through 208-N in accordance with one or more embodiments. As shown, the data structure 200 includes a plurality of page entries 202-1 through 202-N, such as page table entries from a "page table." A page table is a data structure used by a computer operating system in virtual memory system, such as in the host operating system 150 of computer system 100. The page table maintains a mapping between virtual addresses and physical addresses. For example, the virtual address of the page table may be associated with a memory page of a guest OS 170, and this address may map to a physical address location associated with main memory 130. In some embodiments, data structure 200 is a page table of computer system 100. In other embodiments, the data structure 200 may be a guest page table or other kinds of native or created tables in computer system 100 that may be used to maintain virtual addresses of guests. Each page entry within the data structure 200 comprises information related to guest memory pages. For example, page entries 202-1 through 202-N may include page address fields 204-1 through 204-N that respectively represents a virtual address of a memory page for a guest OS, such as guest OS 170, DMA write indicators 208-1 through 208-N, as well as other types of relevant information 206-1 through 206-N.

The DMA write indicators 208-1 through 208-N indicate whether a DMA write operation for a device associated with a corresponding virtual page is in progress. The DMA write indicators 208-1 through 208-N may comprise various kinds of data types that include but are not limited to a bit flag, a byte, a word, etc. In some embodiments, before a guest OS initiates a DMA write operation, a memory access instruction may be sent by the guest OS directly to the data structure 200 to modify or otherwise set to a value a DMA write indicator for the page entry associated with the DMA write operation. After the DMA write operation is complete, the guest OS would send another memory access instruction to clear the DMA write indicator indicating that a DMA write operation is currently not in progress by the device.

An alternative to using a separate indicator field, the DMA write indicator information may be included in the page address fields 204-1 through 204-N. For example, page address fields may include extra information like an extra bit. This extra bit may be set by a guest OS to indicate that a DMA write operation is in progress with a device associated with the page. Still further, an indication of whether the DMA write operation is in progress may alternatively be specified using some separate data pointer that is associated with the data structure 200. In an alternative embodiment, the data structure 200 may be a guest page table, and a used bit in the guest page table may be employed as the DMA write indicator.

Figure 3:
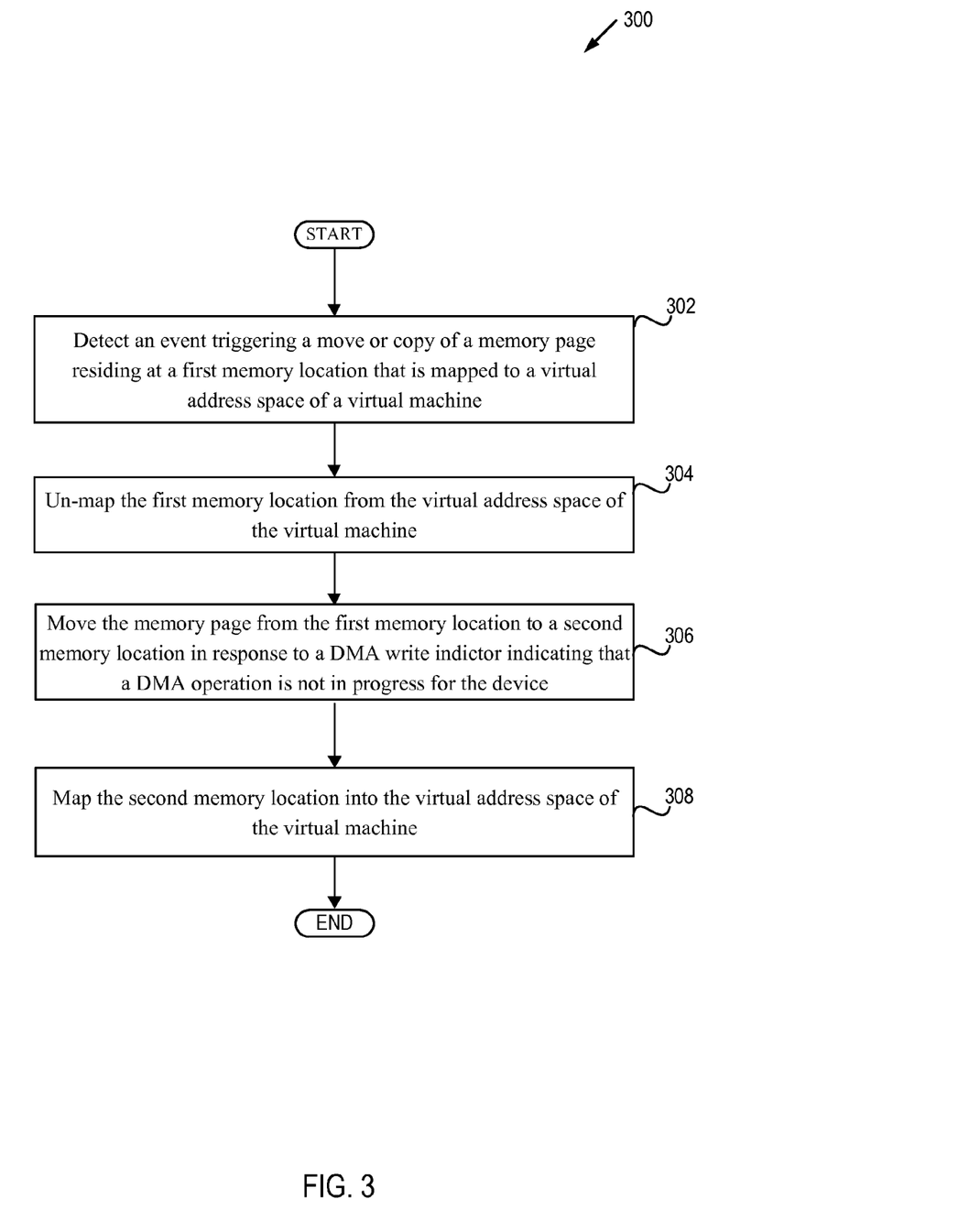
FIG. 3 depicts a flow diagram of a method for moving guest memory in accordance with one or more aspects of the present disclosure.

FIG. 3 depicts a flow diagram of one embodiment of a method 300 for moving guest memory in accordance with one or more aspects of the present disclosure. In one embodiment, the hypervisor 155 of FIG. 1 may perform method 300 to move guest memory of a VM, such as VM 160, assigned to a DMA capable device (e.g., device 180). The method 300 may be performed by processing logic that may comprise hardware (circuitry, dedicated logic, etc.), software (such as is run on a general purpose computer system or a dedicated machine), or a combination of both. Alternatively, in some other embodiments, some or all of the method 300 might be performed by other components of computer system 100. It should be noted that blocks depicted in FIG. 3 can be performed simultaneously or in a different order than that depicted.

Method 300 begins at block 302 where the hypervisor 155 detects an event triggering a move of a memory page residing at a first memory location that is mapped to a virtual address space of a virtual machine. At block 304, the hypervisor 155 un-maps the first memory location from the virtual address space of the virtual machine. At block 306, if a DMA write indicator associated with a hardware device assigned to the virtual machine indicates that a DMA write operation is not in progress by the hardware device, the hypervisor 155 moves the memory page from the first memory location to a second memory location. At block 308, the hypervisor 155 maps the second memory location into the virtual address space of the virtual machine.

Figure 4:
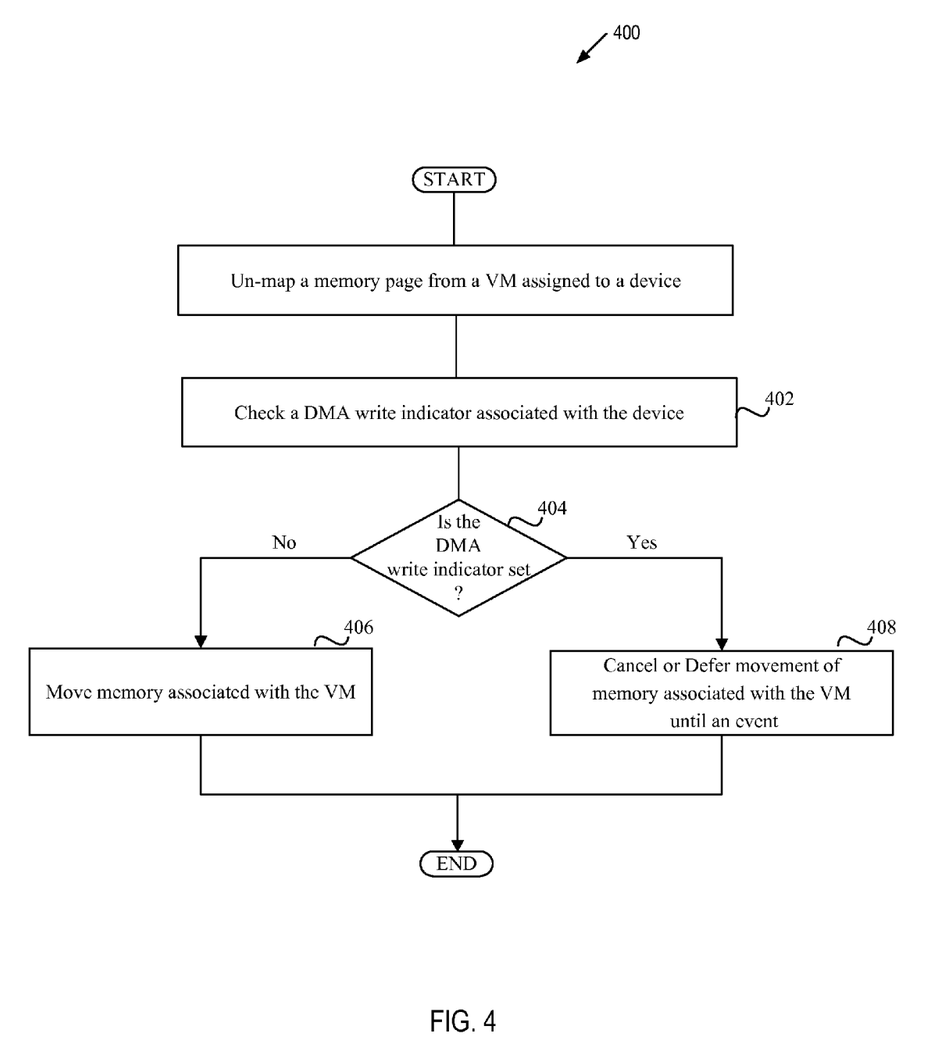
FIG. 4 depicts a flow diagram of a method for determining whether to move guest memory in accordance with one or more aspects of the present disclosure.

FIG. 4 depicts a flow diagram of one embodiment of a method 400 for determining whether to move guest memory in accordance with one or more aspects of the present disclosure. In one embodiment, the hypervisor 155 of FIG. 1 may perform method 400 to determine whether to move guest memory of a VM assigned to a device. The method 400 may be performed by processing logic that may comprise hardware (circuitry, dedicated logic, etc.), software (such as is run on a general purpose computer system or a dedicated machine), or a combination of both. Alternatively, in some other embodiments, some or all of the method 400 might be performed by other components of computer system 100. It should be noted that blocks depicted in FIG. 4 can be performed simultaneously or in a different order than that depicted.

Method begins at block 402 where a memory page may be un-map from a VM assigned to a device. For example, hypervisor 155 may un-map a memory page from VM 160 in response to a triggering event to move memory pages of computer system 100 in accordance with the techniques described herein. At block 404, a DMA write indicator associated with the device may be checked. For example, the hypervisor 155 may check DMA write indicator 190 to determine whether a DMA write operation is in progress by device 180. It should be noted that if there is an attempt access the memory page (for example, by a guest OS of the VM) before the DMA write indicator is checked, this may result in a page fault. In this case, the hypervisor 155 may block the CPU (e.g., processor 120) of computer system 100 until the DMA write indicator is checked and/or other operations of method 400, such as mapping the destination memory location to the virtual address of the memory page, are complete.

Method 400 braches depending on whether the DMA write indicator is set. If the DMA write indicator 190 is not set, this indicates that a DMA write operation is not in progress by device 180. In this case, method 400 may proceed to block 406 to move memory associated with the VM. For example, the hypervisor 155 may move the memory page from a first memory location to a second memory location in memory. Otherwise, if the DMA write indicator is set, this indicates that a DMA write operation is in progress by the device. Here, method 400 may proceed to block 408. At block 408, the hypervisor 155 may cancel or defer movement of memory associated with the VM until an event. For example, this event may include a second triggering event to move the memory page or the expiration of a timeout period.

If the move of the memory page is deferred in block 408, the hypervisor 155 may retry to move the memory page at a later time. In one embodiment, to avoid retrying by the hypervisor 155, a guest OS can also optionally exit to the hypervisor 155 (e.g., using a hypervisor call or I/O memory request). In such cases, after receiving an exit from the guest OS, the hypervisor 155 may move the memory pages of the VM assigned to the device. In some embodiments, the guest OS may exit after a large batch of operations, for example, after a number of DMA operations of a total size of X megabyte is completed.

Figure 5:
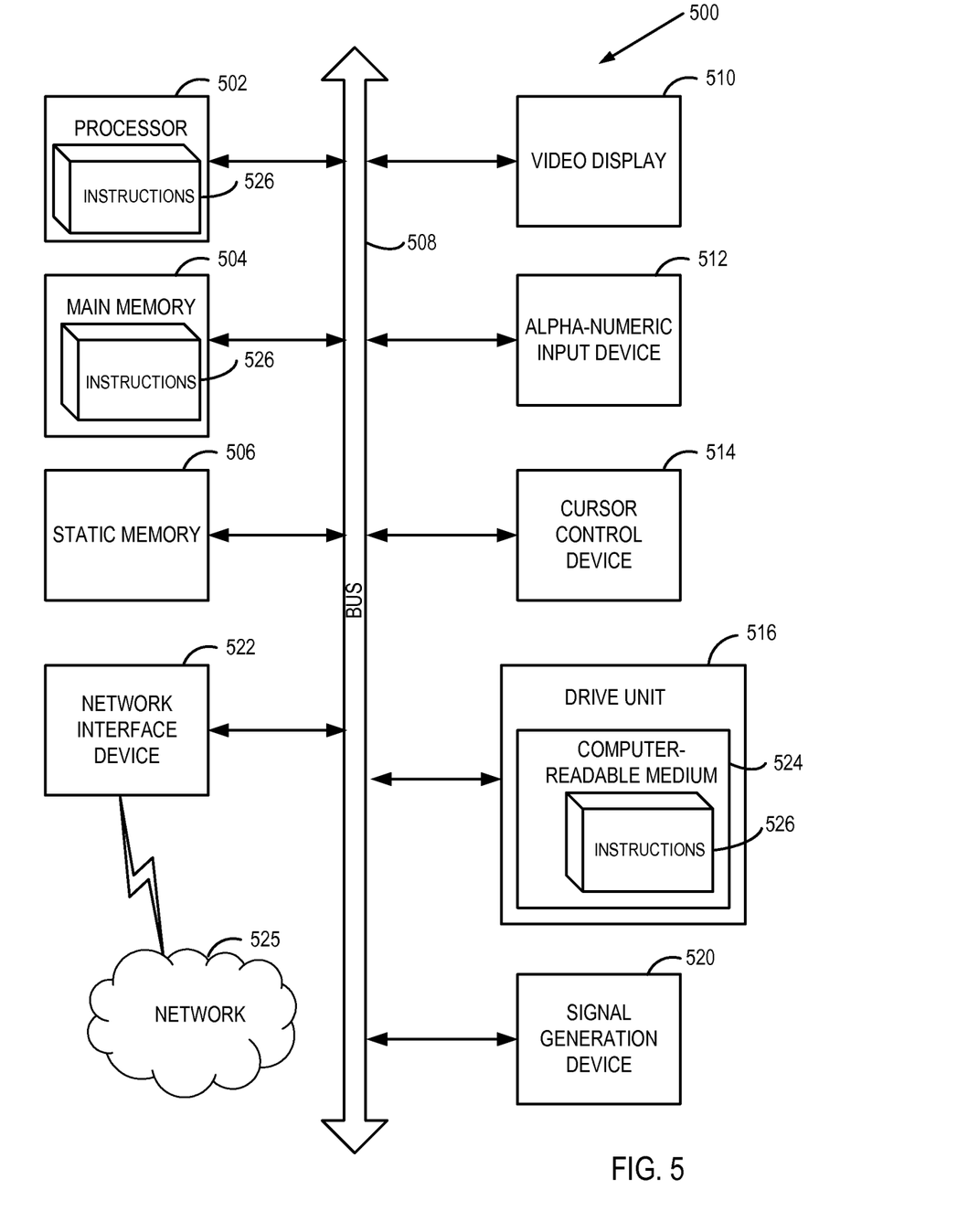
FIG. 5 depicts a block diagram of an example computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a drive unit 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions that may include instructions to execute instructions 526 for performing the operations and steps discussed herein. For example, in one embodiment, the instructions 526 may perform any one of the methods of flow diagram 300 of FIG. 3, flow diagram 400 of FIG. 4 and flow diagram 500 for FIG. 5.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The drive unit 516 or secondary memory may include a computer-readable medium 524 on which is stored one or more sets of instructions 526 (e.g., instructions for the instructions 526.) embodying any one or more of the methodologies or functions described herein. Instructions for the instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522. The instructions 526 may further be transmitted or received over a network 525 via the network interface device 522.

The non-transitory computer-readable storage medium 524 may also be used to store the instructions 526 persistently. While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 525 from which it may receive and provide relevant information regarding geometries.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    detecting, by a processing device of a host computer system, an instruction for triggering a move or copy of a memory page residing at a first memory location that is mapped to a virtual address space of a virtual machine being hosted by the host computer system;
    un-mapping the first memory location from the virtual address space of the virtual machine;
    responsive to determining that a direct memory access (DMA) write indicator associated with a hardware device assigned to the virtual machine is set indicating that a DMA write operation is in progress, deferring the move or copy of the memory page from the first memory location to a second memory location until an occurrence of a triggering event; and mapping, for use by an input/output memory management unit (IOMMU), the second memory location to the virtual address space of the virtual machine.

2. The method of claim 1, further comprising:
detecting an attempt to access the memory page; and
blocking the attempt until mapping the second memory location to the virtual address space is complete.

3. The method of claim 1, wherein the DMA write indicator resides in a shared memory accessible by the virtual machine.

4. The method of claim 1, further comprising: responsive to determining that the DMA write indicator indicates that the DMA write operation is in progress, canceling the move or copy operation for the memory page.

5. The method of claim 1, wherein the triggering event comprises a timeout expiration.

6. The method of claim 1, wherein the triggering event comprises detecting a second event triggering a move or copy of the memory page.

7. A system comprising:
a memory;
a processing device, operatively coupled to the memory, to:
detect an instruction for triggering a move or copy of a memory page residing at a first memory location that is mapped to a virtual address space of a virtual machine being hosted by a host computer system;
un-map the first memory location from the virtual address space of the virtual machine;
responsive to determining that a direct memory access (DMA) write indicator associated with a hardware device assigned to the virtual machine is set indicating that a DMA write operation is in progress, defer the move or copy of the memory page from the first memory location to a second memory location until an occurrence of a triggering event; and
map, for use by an input/output memory management unit (IOMMU), the second memory location to the virtual address space of the virtual machine.

8. The system of claim 7, wherein the processing device is further to:
detect an attempt to access the memory page; and
block the attempt until the map of the second memory location to the virtual address space is complete.

9. The system of claim 7, wherein the DMA write indicator resides in a shared memory accessible by the virtual machine.

10. The system of claim 7, wherein responsive to the DMA write indicator indicating that the DMA write operation is in progress, the processing device is further to cancel a move or copy operation for the memory page.

11. The system of claim 7, wherein the triggering event comprises a timeout expiration.

12. The system of claim 7, wherein the triggering event comprises a second event triggering a move or copy of the memory page.

13. A non-transitory computer-readable storage medium comprising instructions that when executed by a processing device, cause the processing device to:
detect, by the processing device, an instruction for triggering a move or copy of a memory page residing at a first memory location that is mapped to a virtual address space of a virtual machine being hosted by a host computer system;
un-map the first memory location from the virtual address space of the virtual machine;
responsive to determining that a direct memory access (DMA) write indicator associated with a hardware device assigned to the virtual machine is set indicating that a DMA write operation is in progress, defer the move or copy of the memory page from the first memory location to a second memory location until an occurrence of a triggering event; and
map, for use by an input/output memory management unit (IOMMU), the second memory location to the virtual address space of the virtual machine.

14. The non-transitory computer-readable storage medium of claim 13, wherein executable instructions cause the processing device further to:
detect an attempt to access the memory page; and
block the attempt until the map of the second memory location to the virtual address space is complete.

15. The non-transitory computer-readable storage medium of claim 13, wherein the DMA write indicator resides in a shared memory accessible by the virtual machine.

* * * * *